Figure 1:
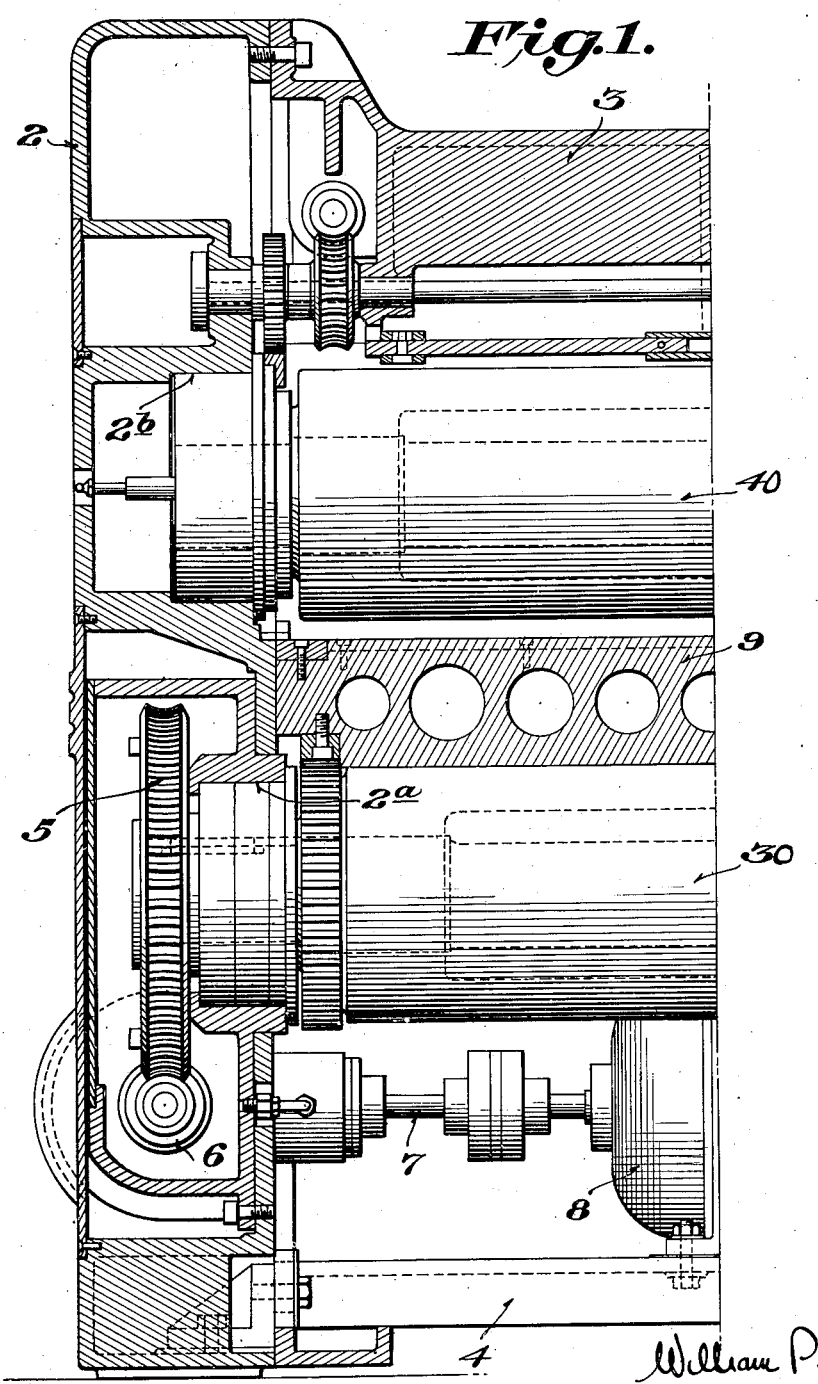

April 12, 1949. W. P. V. ROSS 2,466,968
DRIVE FOR IMPRESSION CYLINDERS
OF MATRIX ROLLERS Filed Oct. 14, 1946 3 Sheets-Sheet 1

Inventor
William P. V. Ross
By
Attorneys

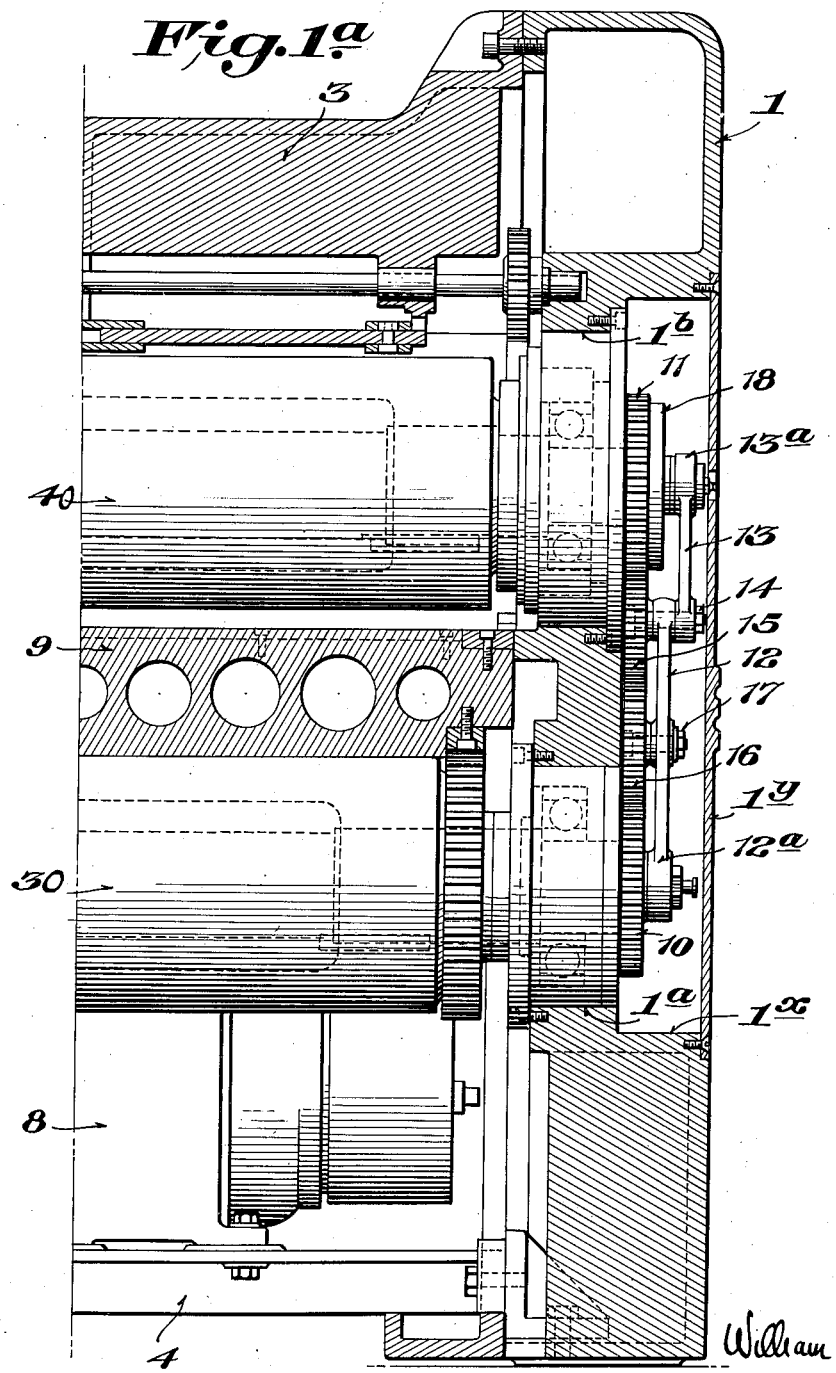

April 12, 1949.  W. P. V. ROSS  2,466,968
DRIVE FOR IMPRESSION CYLINDERS
OF MATRIX ROLLERS Filed Oct. 14, 1946  3 Sheets-Sheet 3

Inventor
William P. V. Ross
By
Attorneys

Patented Apr. 12, 1949

2,466,968

UNITED STATES PATENT OFFICE 2,466,968

DRIVE FOR IMPRESSION CYLINDERS OF MATRIX ROLLERS

William P. V. Ross, Battle Creek, Mich., assignor, by mesne assignments, to Goss Printing Press Company, Chicago, Ill., a corporation of Illinois Application October 14, 1946, Serial No. 703,216

4 Claims. (Cl. 101—12)

This invention is a novel improvement in matrix rollers or the like, particularly with respect to the means for driving the upper roll from the lower roll thereof upon which the reciprocating matrix table rests. Customarily the lower roll is driven by a suitable prime mover and carries a large gear on one end, and the upper roll which cooperates with the table is vertically adjustable with respect to the table and also carries a large gear on one end which meshes directly with the large gear on the end of the lower roll. Since the upper or impression roll is adjustable with respect to the lower roll and the reciprocatory table, to meet variations in chase and mat thicknesses plus blank thicknesses, it is obvious that any adjustment of the upper or impression roll will vary the mating point of the two gears so that they are seldom in perfect mesh on the pitch circle. Such condition renders the gears noisy, and subjects them to abnormal wear.

One object of the present invention is to provide a gear train between the large gears on the ends of the upper and lower rolls, whereby the gears of the train will be in constant perfect mesh irrespective of the adjustment of the upper roll for effecting variations in chase, blanket and mat thicknesses.

Moreover, matrix rollers as at present constructed are subject to difficulty in maintaining the surface speed of the upper or impression roll in agreement with the surface speed of the matrix table which carries the chase and mat through under the impression roll. As an example, when using a 12 inch diameter impression roll, it has been rather standard practice to allow a diameter tolerance equal to plus or minus .010 inch. Under this condition, computing the circumference around a roll which is .010 inch oversize as compared with an exact 12 inch diameter, the circumference would be approximately $\frac{1}{32}$ of an inch longer; on the other hand, if the roll is .010 inch undersize, the circumference would be $\frac{1}{32}$ of an inch shorter than a true 12 inch diameter cylinder. Thus, for each rotation of the impression cylinder, the surface of same will either travel $\frac{1}{32}$ of an inch further than the table, or $\frac{1}{32}$ of an inch less than the table, depending upon whether the maximum tolerance over or under is involved. This condition, coupled with other tolerances in the operating mechanism, causes serious difficulties in that in use of the matrix roller assembly it tends to force the mat either ahead or back during the rolling operation. Often where this difficulty is encountered, I have checked the matter by pulling the key from the impression roll, and then in feeding the chase and mat through under the impression roll, I have observed that the keyways, in the end of the cylinder and gear from which the key has been removed, shift either forwardly or backwardly relative to each other depending largely upon whether the impression roll varies above or below a true 12 inch diameter. In some cases attempts have been made to overcome the above difficulties by omitting the key entirely, thereby permitting the impression roll to rotate freely. This arrangement works satisfactorily once the mat and chase are under the roll, but gives difficulty in getting them to enter thereunder.

A further object of my invention is to provide a novel construction which will provide a positive drive and cause the chase and mat to enter under the impression roll but, after the chase and mat are once entered thereunder, the impression roll will be free to rotate exactly in step with the surface speed of the chase and mat.

I will explain the invention with reference to the accompanying drawings which illustrate one practical embodiment thereof, to enable others familiar with the art to adopt and use the same; and will summarize in the claims the novel features of construction, and novel combinations of parts, for which protection is desired.

In said drawings:

Figures 1 and 1a together show a transverse section through a matrix roller embodying my invention.

Figure 2:
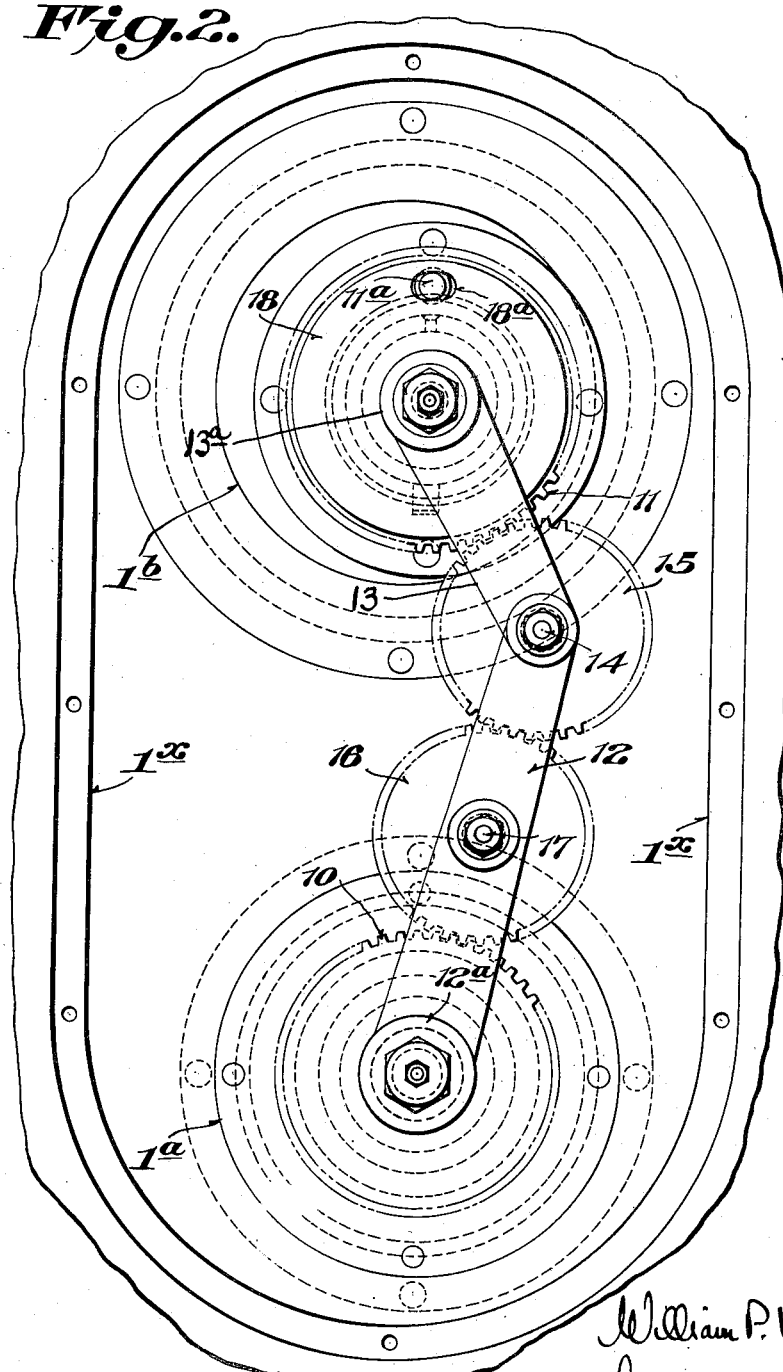

Fig. 2 is an enlarged elevation showing my novel gear train between the shafts of the upper and lower matrix rolls, and also showing my means for positively driving the upper roll at the beginning of the rolling operation while permitting the impression roll to rotate freely after the table has been so moved that the mat and chase have been entered under the impression roll.

The matrix roller shown in Figs. 1 and 2, is generally of well-known type and construction, same consisting of side frames 1 and 2, connected at their upper ends by a top member 3 and at their lower ends by cross bars 4, the side frames having bearings 1a and 2a therein for the lower roll 30, and also eccentric bearings 1b and 2b therein disposed above the bearings 1a and 2a for the upper or impression roll 40 so as to permit the impression roll 40 to be raised or lowered with respect to horizontal table 9; however, any other desired means for permitting raising and lowering of the impression roll 40 may be utilized, the same forming no part of my present invention.

As shown in Fig. 1, the lower roll 30 is provided with a worm gear 5 at one end meshing with a worm 6 driven by a drive shaft 7 from motor 8, the particular drive forming no part of my present invention.

Reciprocally mounted in guides in the frames 1 and 2 is a horizontal table 9 which preferably rests directly upon the lower roll 30 and is disposed below the impression roll 40 in the usual manner, the same forming no part of my present invention.

On the shaft of lower roll 30 at the end opposite from worm gear 5 is a drive gear 10 keyed thereto in any desired manner, the gear being preferably housed in a recess 1x in the side frame 1, which recess 1x also embraces the adjacent end of the shaft of impression roll 40 and is preferably covered by a removable plate 1y to protect the gear train and pressmen from injury.

On the adjacent end of the shaft of impression roll 40 within the recess 1x is a gear 11, which gear, for the purpose hereinafter described, preferably has one tooth more than gear 10 and is a little larger than gear 10. On the end of the shaft of the lower roll 30 beyond the gear 10 is pivoted the hub 12a of an arm 12, while on the end of the shaft of the impression roll 40 is pivoted the hub 13a of an arm 13, the outer ends of the arms 12 and 13 being pivoted together as at 14, so that the angularity between the arms 12 and 13 will change as the impression cylinder 40 is raised or lowered with respect to table 9. On the pivot 14 is journaled an idler gear 15 in constant mesh with the gear 11 on the shaft of impression roll 40. On the arm 12, intermediate its ends, is journaled as at 17 a second idler gear 16 in constant mesh with the idler gear 15, and the gear 10 on the shaft of the lower roll 30. Thus, gear 10 is the first of a train of gears 10—16—15—11, which drives the impression roll 40.

In accordance with the above construction, all four gears 10—16—15—11 may be mounted so as to constantly mesh on their respective pitch circles, and under those conditions if the impression roll 40 is raised or lowered the idler gear-carrying arm 12 and the connecting arm 13 will merely pivot at their connected end while holding the gears of the train constantly in mesh on their respective pitch circles. Thus it will be obvious that the gear train will be quiet in operation, due to proper pitch-line mesh, and will wear longer, other factors remaining constant.

In order to provide an initial positive drive for the impression roll 40 at the beginning of each stroke of the table 9, which will initially cause the chase and mat on the table 9 to grip under the said impression roll, and after the initial grip is secured, will permit the impression roll to rotate freely and exactly in step with the surface speed of the chase and mat as previously stated the gear 11 on the shaft of the impression roll 40 has one tooth more than the gear 10 on the shaft of the lower roll 30. Furthermore, gear 11 on the shaft of the impression roll 40 is arranged to float upon the said shaft, said gear 11 being freely mounted thereon. Contacting the outer face of said gear 11 is a plate 18 (Figs. 1a and 2) of slightly smaller diameter than the gear 11, plate 18 being secured to the shaft of impression roll 40 by means of a key or the like so as to rotate in unison with the impression roll. Plate 18 is provided with arcuate slot 18a (Fig. 2) adjacent its periphery receiving a pin 11a which is carried by the gear 11 adjacent its periphery, so that the pin will move in unison with the gear. Slot 18a is preferably slightly longer than the distance the pin 11a will travel under operating conditions in one direction or the other due to the effect of the added tooth in gear 11 as well as the diameter of the cylinder being oversize or undersize from the optimum to which tolerances are added. Since the driven gear 11 on the shaft of the impression roll 40 has one tooth more than the driving gear 10 of the train of gears 10—16—15—11, the impression cylinder will be positively driven through the gear train 10—16—15—11 to travel at a slower surface speed than the table 9. The reason for this construction will now be explained.

With the table 9 at one end of its travel, and with the chase and mat thereon ready to be passed through under the impression roll 40, the movement of the table 9 towards the impression roll 40 will take up any slack between the pin 11a and one end of the arcuate slot 18a so that the impression roll 40 will be positively initially driven, and will thus draw the chase and mat under same. However, as soon as the chase and mat start traveling through under the impression or upper roll 40, the latter will be freed from its positive drive, since its driven peripheral speed will be slower than that of the table 9, due to the fact that the driving gear 10 has one tooth less than the driven gear 11. Under these conditions, the pin 11a will start traveling along the arcuate slot 18a and will, theoretically, reach the opposite end of the slot when the table 9 is at the other end of its travel. Thus, when another chase and mat are ready to be sent back through under the impression roll 40 in the other direction, the pin 11a will be in contact with the opposite end of slot 18a and will again provide an initial positive drive for starting the chase and mat through under the impression roll 40, whereupon it once more becomes a free roll in its operation. This construction thus operates automatically when the table 9 moves in either direction and completely eliminates the previous difficulties due to the surface speed of the impression roll 40 being either too fast or too slow as compared with the speed of the table 9, all of which causes a tendency to shift the mat on the chase.

I do not limit my invention to the exact form shown in the drawings, for obviously changes may be made therein within the scope of the claims.

I claim:

1. In a matrix roller having a driven lower roll, and having a reciprocable table, and having an impression roll cooperating with the table; a gear train connecting the shafts of the lower and impression rolls; and means in the gear train for affecting an initial positive drive of the impression roll at the beginning of each stroke of the table, said means permitting the impression roll to rotate substantially freely and in step with the surface speed of the work carried by the table during the major portion of each stroke, said gear on the impression roll shaft having one more tooth than the gear on the lower roll shaft whereby said first gear will rotate at a less speed than the second gear; said first gear being freely journaled on the impression roll shaft and having a lateral pin adjacent its periphery; and a plate fixedly mounted on the impression roll shaft and having an arcuate slot adjacent its periphery for receiving the pin, the length of said slot being substantially equal to the distance the pin will travel in one direction or the other due to the effect of the extra tooth and the oversize or undersize from optimum of the impression roll, whereby the ends of the slot will alternately engage the pin at the beginning of successive strokes.

2. In a matrix roller having a driven lower roll, a reciprocable table, and an impression roll cooperating with and vertically adjustable with respect to the table; a gear train connecting the shafts of the lower and impression rolls, whereby when the impression roll is adjusted the gears of the train will remain constantly in mesh on their respective pitch circles; and means in the gear train for effecting an initial positive drive of the impression roll at the beginning of each stroke of the table, said means permitting the impression roll to rotate substantially freely and in step with the surface speed of the work carried by the table during the major portion of each stroke, said gear on the impression roll shaft having one more tooth than the gear on the lower roll shaft whereby said first gear will rotate at a less speed than said second gear; said first gear being freely journaled on the impression roll shaft and having a lateral pin adjacent its periphery; and a plate fixedly mounted on the impression roll shaft and having an arcuate slot adjacent its periphery for receiving the pin, the length of said slot being substantially equal to the distance the pin will travel in one direction or the other due to the effect of the extra tooth and the oversize or undersize from optimum of the impression roll, whereby the ends of the slot will alternately engage the pin at the beginning of successive strokes.

3. In a matrix roller having a driven lower roll, a reciprocable table, and an impression roll cooperating with and vertically adjustable with respect to the table; a gear train connecting the shafts of the lower and impression rolls comprising end gears on the respective shafts; a pair of arms pivoted on the respective shafts and being pivoted together; intermeshing intermediate idler gears journaled on the said arms and meshing with said end gears respectively whereby when the impression roll is adjusted the gears of the train will remain constantly in mesh on their respective pitch circles; and means in the gear train for effecting an initial positive drive of the impression roll at the beginning of each stroke of the table, said means permitting the impression roll to rotate substantially freely and in step with the surface speed of the work carried by the table during the major portion of each stroke, said gear on the impression roll shaft having one more tooth than the gear on the lower roll shaft whereby said first gear will rotate at a less speed than said second gear; said first gear being freely journaled on the impression roll shaft and having a lateral pin adjacent its periphery; and a plate fixedly mounted on the impression roll shaft and having an arcuate slot adjacent its periphery receiving the pin, the length of said slot being substantially equal to the distance the pin will travel in one direction or the other due to the effect of the extra tooth and the oversize or undersize from optimum of the impression roll, whereby the ends of the slot will alternately engage the pin at the beginning of successive strokes.

4. In a matrix roller having a driven lower roll, a reciprocable table, and an impression roll cooperating with and vertically adjustable with respect to the table; a gear train connecting the shafts of the lower and impression rolls comprising a gear on the shaft of the lower roll; a second gear on the shaft of the impression roll; a pair of arms pivoted on the shafts of the lower and impression rolls respectively and having their outer ends pivoted together; intermeshing intermediate idler gears journaled on the said arms and meshing with the first and second gears respectively whereby when the impression roll is adjusted the gears of the train will remain constantly in mesh on their respective pitch circles; and means in the gear train for effecting an initial positive drive of the second gear and impression roll at the beginning of each stroke of the table, said means permitting the impression roll to rotate substantially freely and in step with the surface speed of the work carried by the table during the major portion of each stroke, said first gear having one less tooth than the second gear whereby the second gear will be rotated at less speed than the first gear; said second gear being freely journaled on the shaft of the impression roll and having a lateral pin adjacent its periphery; and a plate fixedly mounted on the shaft of the impression roll beside the second gear and having an arcuate slot adjacent its periphery receiving the pin, the length of said slot being substantially equal to the distance the pin will travel in one direction or the other due to the effect of the extra tooth and the oversize and undersize from optimum of the impression roll, whereby the ends of the slot will alternately engage the pin at the beginning of successive strokes.

WILLIAM P. V. ROSS.

REFERENCES CITED

The following references are of record in the file of this patent:

UNITED STATES PATENTS

| Number | Name | Date |
| --- | --- | --- |
| 429,331 | Wise | June 3, 1890 |
| 656,901 | Main | Aug. 28, 1900 |
| 767,653 | McDonald | Aug. 16, 1904 |
| 1,086,722 | Langston | Feb. 10, 1914 |
| 1,180,593 | Leilich | Apr. 25, 1916 |
| 1,608,050 | Bailey | Nov. 23, 1926 |
| 1,743,902 | Rada | Jan. 14, 1930 |
| 1,748,820 | Alexandrescu | Feb. 25, 1930 |
| 1,929,068 | Isbell | Oct. 3, 1933 |
| 1,971,116 | Mohan | Aug. 21, 1934 |
| 2,083,099 | Seybold | June 8, 1937 |
| 2,096,643 | Mills | Oct. 19, 1937 |
| 2,150,711 | Behrens | Mar. 14, 1939 |

FOREIGN PATENTS

| Number | Country | Date |
| --- | --- | --- |
| 152,859 | Germany | July 2, 1904 |